(12) United States Patent
Voicu et al.

(10) Patent No.: US 10,839,283 B1
(45) Date of Patent: Nov. 17, 2020

(54) SYSTEMS AND METHODS OF ACTIVITY TARGET SELECTION FOR ROBOTIC PROCESS AUTOMATION

(71) Applicant: UiPath Inc., New York, NY (US)

(72) Inventors: Cosmin V. Voicu, Buchare (RO); Dragos H. Bobolea, Buchare (RO); Ion Miron, Buchare (RO); Ilie C. Paunel, Slatina (RO); Bogdan Ripa, Buchare (RO)

(73) Assignee: UiPath Inc., New York, NY (US)

( * ) Notice: Subject to any disclaimer, the term of this patent is extended or adjusted under 35 U.S.C. 154(b) by 0 days.

(21) Appl. No.: 16/601,272

(22) Filed: Oct. 14, 2019

(51) Int. Cl.
G06F 9/451 (2018.01)
G06N 3/00 (2006.01)

(52) U.S. Cl.
CPC ............. *G06N 3/004* (2013.01); *G06F 9/451* (2018.02)

(58) Field of Classification Search
CPC .......... G06N 3/004; G06F 9/451; G06F 3/048
See application file for complete search history.

(56) References Cited

U.S. PATENT DOCUMENTS

| | | | |
|---|---|---|---|
| 9,424,167 B2 | 8/2016 | Lee et al. | |
| 9,600,401 B1* | 3/2017 | Haischt | G06F 11/3664 |
| 9,965,139 B2 | 5/2018 | Nychis et al. | |
| 2003/0126517 A1* | 7/2003 | Givoni | G06F 11/3688 |
| | | | 714/46 |
| 2012/0117456 A1* | 5/2012 | Koskimies | G06F 9/44505 |
| | | | 715/224 |
| 2018/0173614 A1 | 6/2018 | Gong et al. | |
| 2018/0189170 A1* | 7/2018 | Dwarakanath | G06K 9/66 |
| 2019/0050323 A1 | 2/2019 | Kogan et al. | |
| 2019/0340114 A1* | 11/2019 | Podoler | G06F 11/3688 |

OTHER PUBLICATIONS

Gajapathy et al., Robotic Process Automation in a Virtual Environment, downloaded from https://www.pwc.in/assets/pdfs/publications/2018/robotic-process-automation-in-a-virtual-environment.pdf, 2018, the year of publication is sufficiently earlier than the effective U.S. filing date and any foreign priority date so that the particular month of the publication is not in issue.
Smartbear, "GUI Object Recognition", downloaded from https://web.archive.org/web/20190417190953/https://smartbear.com/product/testcomplete/features/gui-object-recognition/, Apr. 17, 2019.
UiPath, Compiled pages from web-based UiPath user guide, downloaded on Oct. 23, 2019, believed publicly available at least as of Oct. 13, 2019.
Voicu et al., U.S. Appl. No. 16/601,200, filed Oct. 14, 2019.

* cited by examiner

*Primary Examiner* — Jeanette J Parker
(74) *Attorney, Agent, or Firm* — Law Office of Andrei D Popovici, PC

(57) ABSTRACT

A software robot is designed to carry out an activity (e.g., a mouse click, a text input, etc.) on a target element (e.g., a button, an input field, etc.) of a user interface. The robot's code specification is configured to include an on-screen image of the target element and a text displayed by the target element. The robot is configured to automatically identify the target element at runtime according to an element ID specified in the source code of the user interface, and when such identification fails, to identify the target element according to the text and image stored in the robot's code.

19 Claims, 12 Drawing Sheets

SYSTEMS AND METHODS OF ACTIVITY TARGET SELECTION FOR ROBOTIC PROCESS AUTOMATION

BACKGROUND

The invention relates to robotic process automation (RPA), and in particular to systems and methods for automatically identifying a user interface element targeted for an activity such as a mouse click or a text input.

RPA is an emerging field of information technology aimed at improving productivity by automating repetitive computing tasks, thus freeing human operators to perform more intellectually sophisticated and/or creative activities. Notable tasks targeted for automation include extracting structured data from documents, and interacting with user interfaces, for instance to fill in forms, among others.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of coding per se.

However, automating the interaction with a user interface poses substantial technical challenges, for instance unambiguously identifying a target element such as a button or a form field. Furthermore, RPA applications may fail due to changes in the appearance of the interface (e.g., positioning of various elements, color scheme, fonts, etc.) occurring between the design of the respective software robot and runtime. Therefore, there is continuing interest in developing robust and scalable software robots that are insensitive to such changes.

SUMMARY

According to one aspect, a method comprises employing at least one hardware processor of a computer system, in response to receiving an RPA script comprising a set of target features and a set of anchor features, the target features characteristic of a target element of a target user interface (UI), the anchor features characteristic of an anchor element of the target UI, to automatically identify a runtime instance of the target element within a runtime UI exposed by the computer system. The method further comprises automatically carrying out an operation that reproduces a result of an interaction of a human operator with the runtime instance of the target element, the operation determined according to the RPA script. The set of target features comprises a target ID indicative of a position of the target element within a tree representation of the target UI, a target image comprising an image of the target element within the target UI, and a target text comprising a sequence of characters displayed by the target element within the target UI. The set of anchor features comprises an anchor ID indicative of a position of the anchor element within the tree representation of the target UI, an anchor image comprising an image of the anchor element within the target UI, and an anchor text comprising a sequence of characters displayed by the anchor element within the target UI. The method comprises identifying the runtime instance of the target element according to the target ID, target image, target text, anchor ID, anchor image, and anchor text.

According to another aspect, a computer system comprises at least one hardware processor configured to execute an automation target application and RPA robot. The automation target application is configured to expose a runtime UI. The RPA robot is configured, in response to receiving an RPA script comprising a set of target features and a set of anchor features, the target features characteristic of a target element of a target UI, the anchor features characteristic of an anchor element of the target UI, to automatically identify a runtime instance of the target element within a runtime UI exposed by the computer system. The RPA robot is further configured to automatically carry out an operation that reproduces a result of an interaction of a human operator with the runtime instance of the target element, the operation determined according to the RPA script. The set of target features comprises a target ID indicative of a position of the target element within a tree representation of the target UI, a target image comprising an image of the target element within the target UI, and a target text comprising a sequence of characters displayed by the target element within the target UI. The set of anchor features comprises an anchor ID indicative of a position of the anchor element within the tree representation of the target UI, an anchor image comprising an image of the anchor element within the target UI, and an anchor text comprising a sequence of characters displayed by the anchor element within the target UI. Automatically identifying the runtime instance of the target element comprises identifying the runtime instance of the target element according to the target ID, target image, target text, anchor ID, anchor image, and anchor text.

According to another aspect, a non-transitory computer-readable medium stores instructions which, when executed by at least one hardware processor of a computer system configured to expose a runtime UI, cause the computer system, in response to receiving an RPA script comprising a set of target features and a set of anchor features, the target features characteristic of a target element of a target UI, the anchor features characteristic of an anchor element of the target UI, to automatically identify a runtime instance of the target element within a runtime UI exposed by the computer system. The instructions further cause the computer system to automatically carry out an operation that reproduces a result of an interaction of a human operator with the runtime instance of the target element, the operation determined according to the RPA script. The set of target features comprises a target ID indicative of a position of the target element within a tree representation of the target UI, a target image comprising an image of the target element within the target UI, and a target text comprising a sequence of characters displayed by the target element within the target UI. The set of anchor features comprises an anchor ID indicative of a position of the anchor element within the tree representation of the target UI, an anchor image comprising an image of the anchor element within the target UI, and an anchor text comprising a sequence of characters displayed by the anchor element within the target UI. Automatically identifying the runtime instance of the target element comprises identifying the runtime instance of the target element according to the target ID, target image, target text, anchor ID, anchor image, and anchor text.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
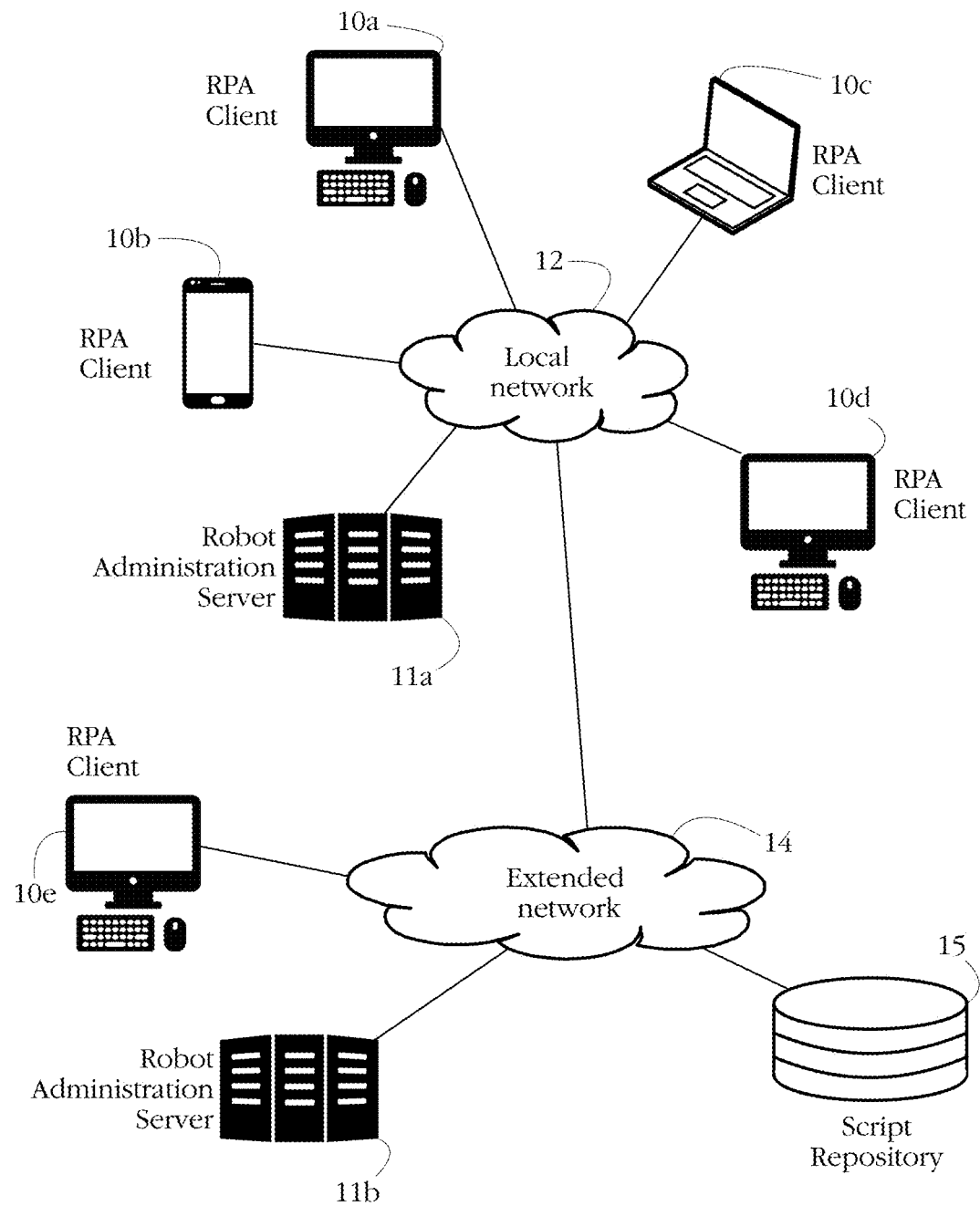
FIG. 1 shows an exemplary robotic process automation (RPA) system according to some embodiments of the present invention.

FIG. 1 shows an exemplary robotic process automation system according to some embodiments of the present invention. Each of a plurality of RPA clients 10a-e represents a computing device having at least a hardware processor, a memory unit and a network adapter enabling the respective RPA client to connect to a computer network and/or to other computing devices. Exemplary RPA clients 10a-e include personal computers, laptop and tablet computers, and mobile telecommunication devices (e.g., smartphones), among others. In an exemplary use case scenario, RPA clients 10a-d represent desktop computers belonging to an accounting or a human resources department of a company. The illustrated RPA clients 10a-d are interconnected by a local communication network 12, which may comprise a local area network (LAN). Clients 10a-d may further access an extended network 14 which may comprise a wide-area network (WAN) and/or the Internet. In the exemplary configuration of FIG. 1, RPA client 10e is connected directly to extended network 14. Such a client may represent a mobile computer, such as a laptop, tablet computer, or mobile telephone that connects to network 14 at various access points.

In a typical RPA scenario, an employee of a company uses a business application (e.g., word processor, spreadsheet editor, browser, email application) to perform a repetitive task, for instance to issue invoices to various business clients. To actually carry out the respective task, the employee performs a sequence of operations/actions, which is herein deemed a business process. Exemplary operations forming a part of an invoice-issuing business process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. RPA software executing on the employee's computer may automate the respective business process by mimicking the set of operations performed by the respective human operator in the course of carrying out the respective task. Exemplary processes typically targeted for such automation include processing of payments, invoicing, communicating with business clients (e.g., distribution of newsletters and/or product offerings), internal communication (e.g., memos, scheduling of meetings and/or tasks), payroll processing, etc.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Figure 2:
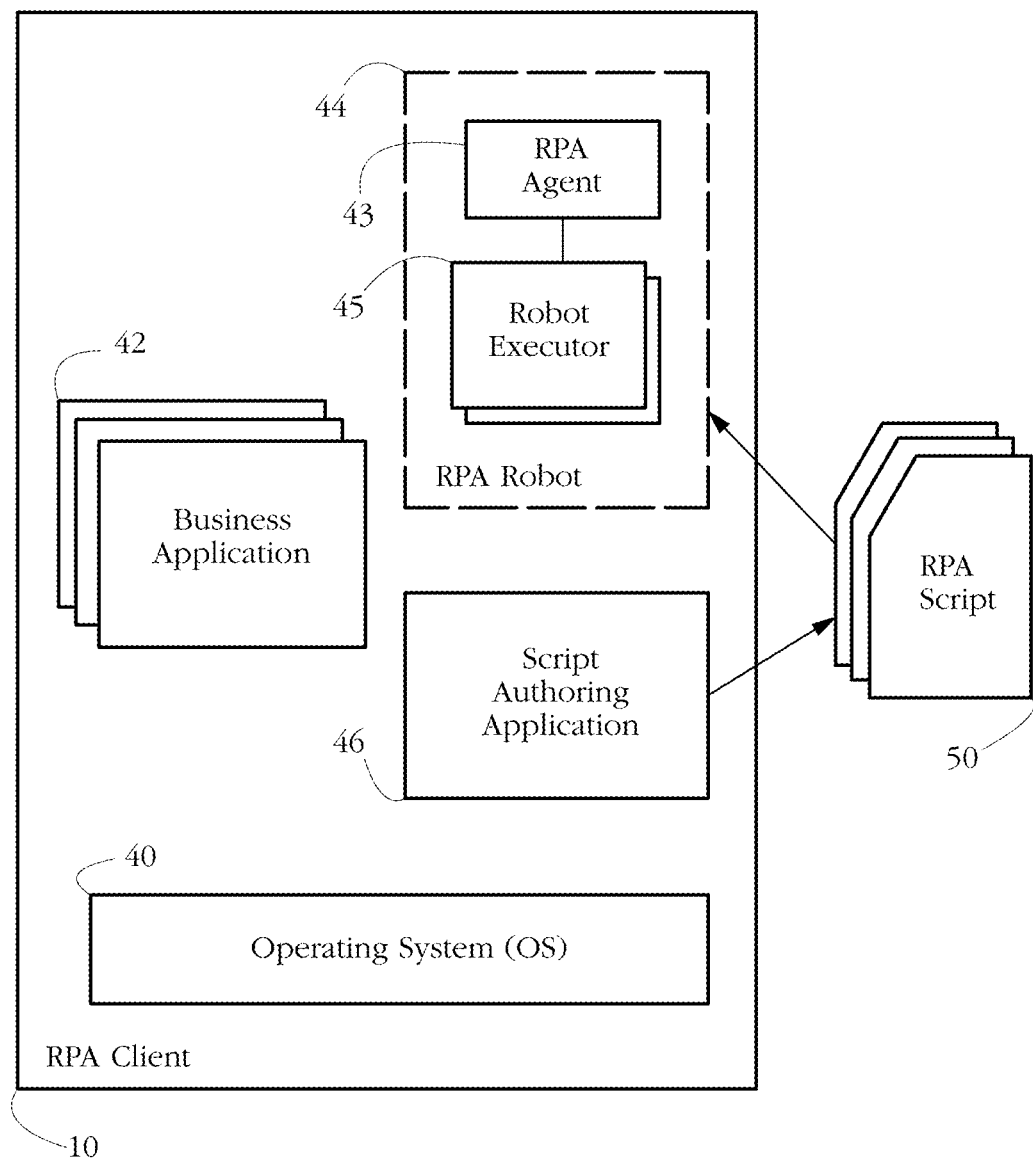
FIG. 2 shows exemplary software executing on an RPA client according to some embodiments of the present invention.

FIG. 2 shows exemplary software executing on an RPA client 10 according to some embodiments of the present invention. RPA client 10 may represent any of RPA clients 10a-e in FIG. 1. RPA client 10 executes an operating system (OS) 40, and a set of business applications 42. OS 40 may comprise any widely available operating system such as Microsoft Windows®, MacOS®, Linux®, iOS®, or Android®, among others, comprising a software layer that interfaces between applications 42 and the hardware of RPA client 10. Business applications 42 generically represent any computer program used by a human operator of RPA client 10 to carry out a task. Exemplary business applications 42 include, among others, a word processor, a spreadsheet application, a graphics application, a browser, a social media application, and an electronic communication application. At least one business application 42 is configured to expose a user interface (UI) that is targeted for automation as detailed below.

In some embodiments, RPA client 10 further executes an RPA robot 44 which comprises a set of interconnected computer programs that collectively implement an automation of a business process. An exemplary RPA robot is constructed using a Windows Workflow Foundation Application Programming Interface from Microsoft®, Inc. In some embodiments, RPA robot 44 executes within a separate, dedicated virtual machine instantiated on RPA client 10.

Components of RPA robot 44 include an RPA agent 43 and a set of robot executors 45. Robot executors 45 are configured to receive an RPA script 50 indicating a sequence of operations (also known in the art as activities) that mimic the actions of a human operator carrying out a business process, and to actually execute the respective sequence of operations on the respective client machine. RPA scripts 50 are typically process-specific, i.e., each distinct business process is described by a distinct set of RPA scripts. RPA script 50 may be formulated according to any data specification known in the art. In a preferred embodiment, RPA script 50 is encoded in a version of an extensible markup language (XML), but script 50 may also be formulated in a programming language such as C#, Visual Basic, Java, etc. Alternatively, RPA script 50 may be specified in an RPA-specific version of bytecode, or even as a sequence of instructions formulated in a natural language such as English, Spanish, Japanese, etc. In some embodiments, script 50 is pre-compiled into a set of native processor instructions (e.g., machine code).

In some embodiments, robot executor 45 comprises an interpreter (e.g., a just-in-time interpreter or compiler) configured to translate RPA script 50 into a runtime package comprising processor instructions for carrying out the operations described in the respective script. Executing script 50 may thus comprise executor 45 translating RPA script 50 and instructing a processor of RPA client 10 to load the resulting runtime package into memory and to launch the runtime package into execution.

RPA agent 43 may manage the operation of robot executors 45. For instance, RPA agent 43 may select tasks/scripts for execution by robot executor(s) 45 according to an input from a human operator and/or according to a schedule. Agent 43 may further configure various operational parameters of executor(s) 45. When robot 44 includes multiple executors 45, agent 43 may coordinate their activities and/or inter-process communication. RPA agent 43 may further manage communication between RPA robot 44 and other components of the RPA system illustrated in FIG. 1. Such components may execute on other RPA clients and/or a set of robot administration servers 11a-b. In one such example, servers 11a-b may operate a robot orchestrator service coordinating RPA activities across multiple client machines and enabling complex scheduling and/or license management. Servers 11a-b may further receive data from individual RPA robots indicating various intermediate values and/or results of executing RPA scripts. Such data may be used to generate activity reports, to enforce licensing agreements, and/or to mitigate malfunctions.

In some embodiments, RPA client 10 further executes a script authoring application 46 configured to enable a human operator of RPA client 10 to create RPA script 50 and thus effectively design a robot to perform a set of activities. Authoring application 46 may function like an integrated development environment (IDE), comprising a code editor and/or a user interface enabling the operator to interact with a set of tools for modeling a business process. An exemplary authoring application may allow a user to select a business application 42 and to indicate a desired manner of interacting with the respective application, e.g., to indicate a sequence of operations to be performed by robot 44. Exemplary operations include, for instance, opening a specific Excel® spreadsheet, reading data from a specific row/column of a data table, processing the respective data in a specific manner, clicking on a specific button, composing and sending an email message, navigating to a specific unified record location (URL), etc. In some embodiments, authoring application 46 outputs RPA scripts 50 in a format readable by RPA robot 44 (e.g., XML). RPA scripts 50 may be stored in a script repository 15 communicatively coupled to and accessible to RPA clients 10a-e via network 12 and/or 14 (see FIG. 1). In a preferred embodiment, script repository 15 is directly linked to robot administration server(s) 11a-b. Script repository 15 may be organized as a database, e.g., any structured data collection allowing a selective retrieval of scripts 50 according to a set of criteria.

A skilled artisan will appreciate that not all components illustrated in FIG. 2 need to execute on the same physical processor or machine. In typical RPA configurations, script development/robot design is carried out on one machine (commonly known in the art as 'design-side'). The resulting RPA script 50 is then distributed to multiple other users and machines for execution (usually known as 'runtime-side' or simply 'runtime').

Figure 3:
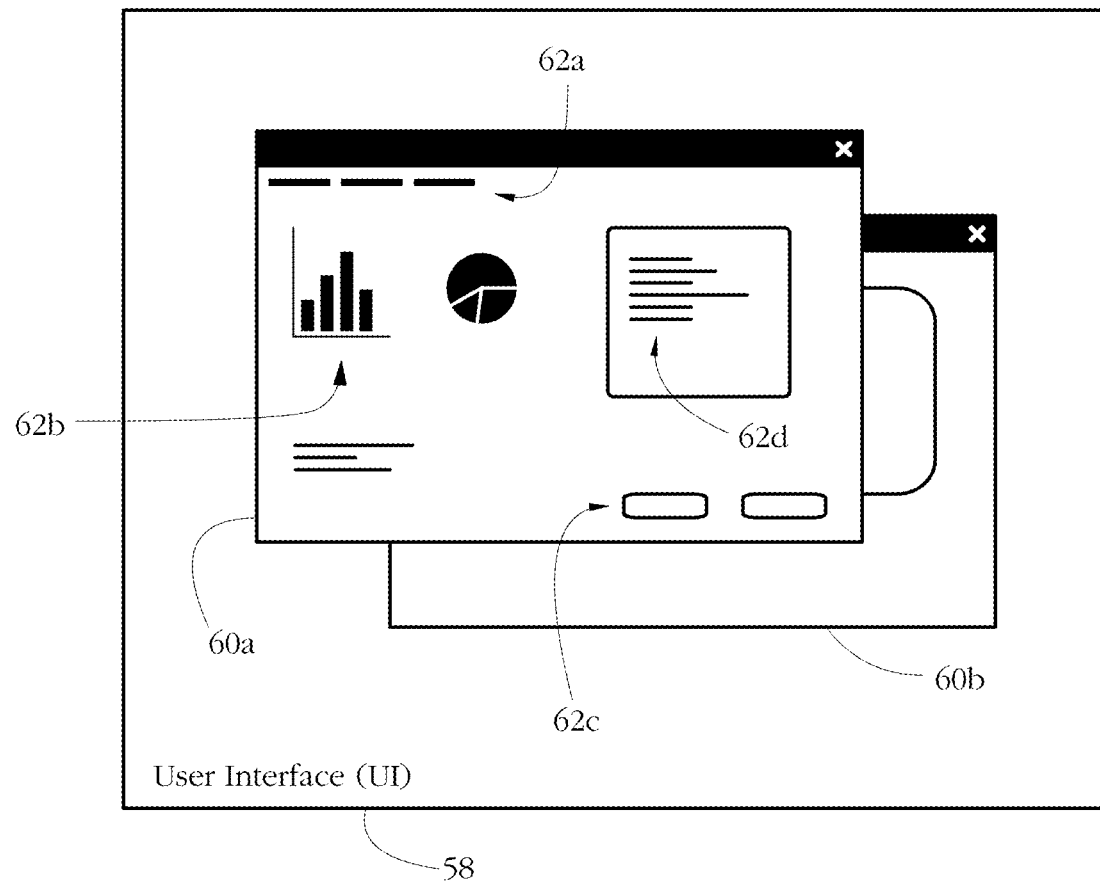
FIG. 3 shows an exemplary user interface (UI) comprising a plurality of UI elements according to some embodiments of the present invention.

FIG. 3 shows an exemplary user interface (UI) 58 according to some embodiments of the present invention. UI 58 may be exposed by any of business applications 42. A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. Illustrative UI 58 has a set of exemplary windows 60*a-b* and a set of exemplary UI elements including a menu indicator 62*a*, an icon 62*b*, a button 62*c*, and a text box 62*d*. Other exemplary UI elements comprise, among others, a window, a label, a form, an individual form field, a toggle, a link (e.g., a hyperlink, hypertext, or a uniform resource identifier). UI elements may display information, receive input (text, mouse events), and/or control a functionality of software and/or the respective computer system.

Some UI elements are interactive in the sense that acting on them (e.g., clicking button 62*c*) triggers a behavior/reaction. Such behaviors/reactions are typically specific to the respective element or to a group of elements. For instance, clicking a save button produces a different effect to clicking a print button. The same keyboard shortcut (e.g., Ctrl-G) may have one effect when executed in one window/application, and a completely different effect when executed in another window/application. So, although the operation/action is the same (executing a click, pressing a combination of keyboard keys, writing a sequence of characters, etc.), the result of the respective action may depend substantially on the operand of the respective operation. An operand is herein defined as the UI element that is acted upon by a current operation/action such as a click or a keyboard event, or stated otherwise, the UI element selected to receive the respective user input. The terms 'target' and 'operand' are herein used interchangeably. Since UI element behaviors are element-specific, successful RPA may require unambiguously and correctly identifying operands for each scripted RPA activity.

Figure 4:
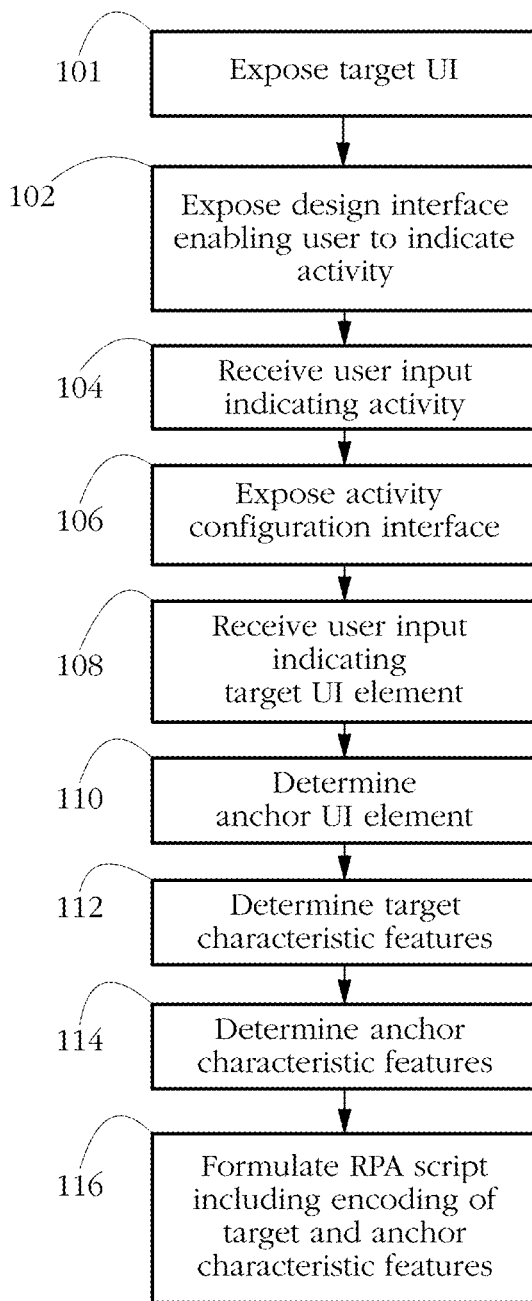
FIG. 4 shows an exemplary sequence of steps performed by a script authoring application according to some embodiments of the present invention.

FIG. 4 shows an exemplary sequence of steps performed by script authoring application 46 according to some embodiments of the present invention. A step 101 exposes a target UI, i.e., a design-side instance of a user interface of a business application 42, which is the target of the current automation. Step 101 may comprise, for instance, invoking an instance of business application 42. In a step 102, application 46 may expose a robot design interface (e.g., a GUI) enabling a user to indicate a desired activity to be performed by robot 44 on the exposed target UI. In some embodiments, the activities may be reached via a hierarchy of activity menus. Activities may be grouped according to various criteria, for instance, according to a type of business application (e.g., MS Excel® activities, web activities, email activities), and/or according to a type of interaction (e.g., mouse activities, hotkey activities, data grabbing activities, form filling activities, etc.). A step 104 receives user input indicating the respective activity. For instance, step 104 may comprise intercepting a mouse click event and determining a menu item that the user has clicked on to select an activity. In a further step 106, application 46 may expose an activity configuration interface enabling the user to configure various options and/or parameters of the respective activity. One exemplary activity parameter is the operand/target UI element of the respective activity. In one example wherein the activity comprises a mouse click, the target UI element may be a button, a menu item, a hyperlink, etc. In another example wherein the activity comprises filling out a form, the target UI element may be the specific form field that should receive the respective text input. Application 46 may enable the user to indicate the target UI element in various ways. For instance, it may invite the user to select the target element from a menu/list of candidate UI elements. In a preferred embodiment, application 46 may expose an instance of the target UI (i.e., the UI of the business application that robot 44 is supposed to interact with, for instance MS Excel®, a browser, an email program, etc.), and highlight a subset of UI elements within the respective UI, inviting the user to click on one to indicate a selection. In a step 108, application 46 may receive and process the user input indicating the selected target element, for instance by calling certain OS functions to detect the mouse click and identifying the clicked UI element.

Figure 5:
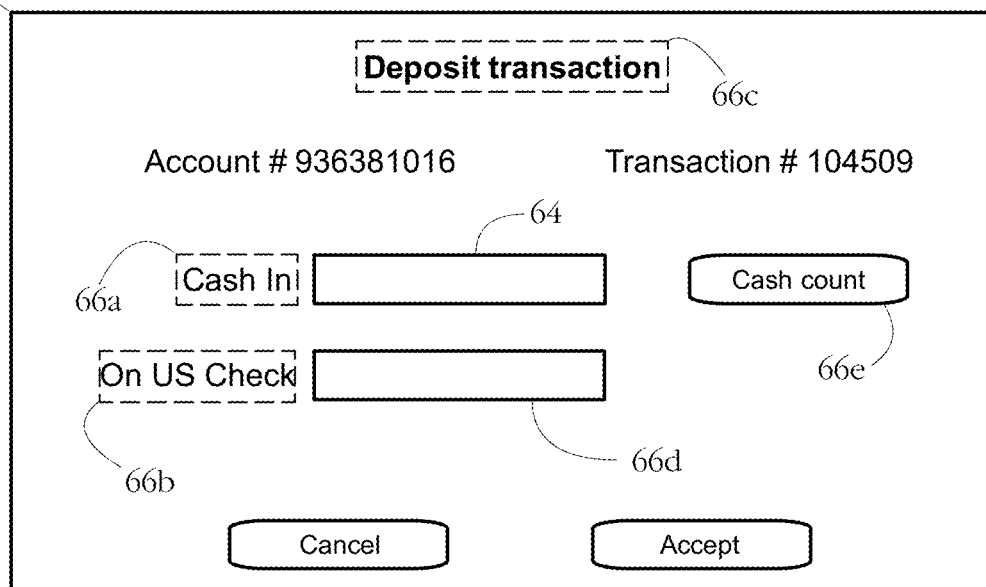
FIG. 5 illustrates an exemplary user interface, a target element, and a plurality of candidate anchor elements according to some embodiments of the present invention.

Next, in a step 110, some embodiments may automatically determine an anchor UI element associated with the selected target element. An anchor element (or simply 'anchor') is herein defined as a UI element co-displayed with an associated target UI element, in the sense that the target and anchor are visible at the same time within the respective user interface. Furthermore, the anchor and target elements typically have a semantic connection, for instance they both belong to the same group/container of UI elements, and/or they perform a function together. Exemplary anchor elements associated with an input field include, among others, a text label displayed in the vicinity of the respective input field, and a title of a form that includes the respective input field. Exemplary anchor elements associated with a button include the text displayed on top of the respective button, and another button of the same UI. FIG. 5 shows an exemplary UI 58 having a target element 64 and a plurality of potential anchor elements 66*a-e* according to some embodiments of the present invention.

Figure 6:
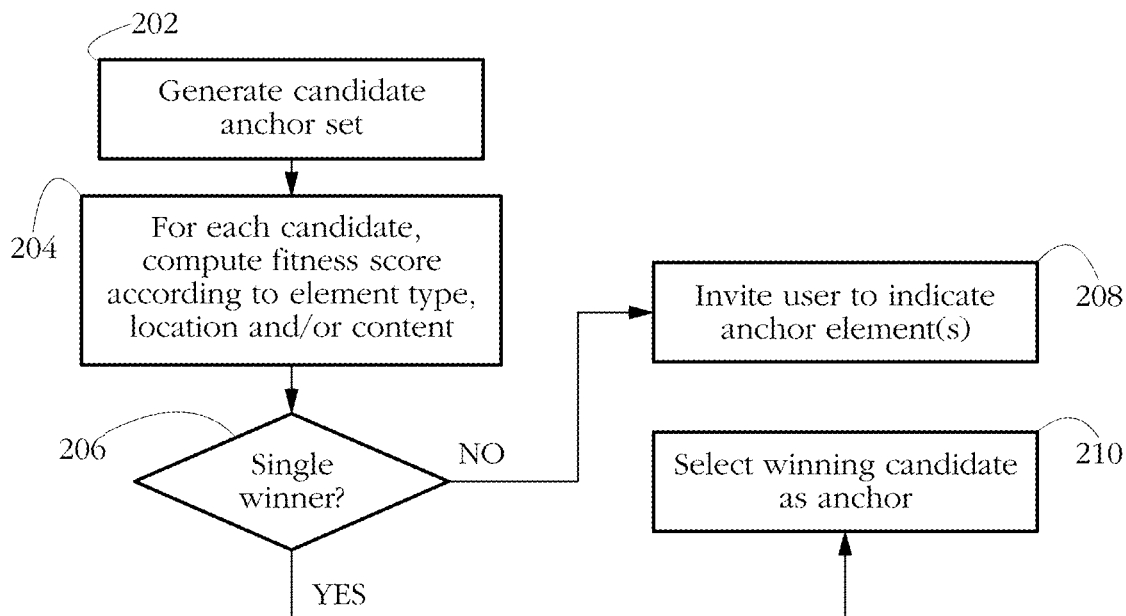
FIG. 6 shows an exemplary sequence of steps carried out to automatically determine an anchor element associated with a target element, according to some embodiments of the present invention.

Determining the anchor of a target element may comprise selecting the anchor from a set of candidate UI elements, for instance as shown in FIG. 6. In a step 202, application 46 may generate a set of candidate anchor elements (see e.g., items 66*a-e* in FIG. 5) selected from the set of UI elements displayed by UI 58. The candidate anchor elements may be selected according to an element type of the respective target element (e.g., button, text, input field, etc.). In some embodiments, the candidate anchors may be selected according to whether they belong to the same group of elements/UI container as the respective target. For instance, when the target element is a form field, some embodiments will select anchor candidates only from among UI elements belonging to the same form field. In the case of an HTML document, some embodiments may select label candidates from the same <div> or <span> container as the target element.

Next, in a step 204, application 46 may evaluate each candidate anchor element according to a set of criteria. In some embodiments, step 204 comprises determining an anchor fitness score, which may combine multiple sub-scores evaluated according to distinct criteria. An exemplary criterion is a relative position of the candidate anchor with respect to the target element. The relative position may be determined according to a set of distances, an angle, and/or a degree of overlap between the respective target element and candidate anchor element. Examples of such determinations are described in detail below, in relation to FIGS. 13-16. Some embodiments consider that UI elements which are located in the vicinity of, and/or are substantially aligned with the target element, are relatively more reliable anchors. In such embodiments, such UI elements may receive a higher fitness score than other UI elements which are more distant and/or not aligned with the selected target element.

Other exemplary anchor fitness criteria may include an image and/or text content of the respective UI element. Some embodiments prefer text labels as anchor elements, so UI elements that do not contain text may receive a relatively lower fitness score than other UI elements that display a fragment of text. Another exemplary criterion may be a length of the text displayed by the UI element—some embodiments may favor small text elements, since they are more likely to be labels. In such embodiments, relatively small text elements may receive a relatively higher fitness score compared to text elements having a substantial amount of text.

Yet another exemplary criterion may include a count of anchor candidates that have a similar appearance, for instance a count of UI elements that display identical texts. In one exemplary scenario, target UI 58 includes a form designed to collect data about multiple people and having multiple fields labeled 'Last Name'. In such situations, a 'Last Name' label may not be very reliable in identifying a specific form field. Therefore, some embodiments may determine whether each anchor candidate is unique (in the sense that there is no other UI element having a similar image or displaying a similar text), and when no, assign the respective anchor candidate a relatively low anchor fitness score. An alternative embodiment may assign multiple anchors to the same target element, for instance a label located in the proximity of the respective form field, and a title of the respective form or block of inputs.

A step 206 may then compare scores evaluated for the candidate anchors. When there is a clear winner, in a step 210 script authoring application 46 may select the candidate element with the highest fitness score as anchor element associated with the target element determined in step 108 (FIG. 4). In case of a tie, i.e., when multiple candidates have the same fitness score, some embodiments may invite the user to explicitly indicate a UI element to be used as anchor (step 208).

Figure 7:
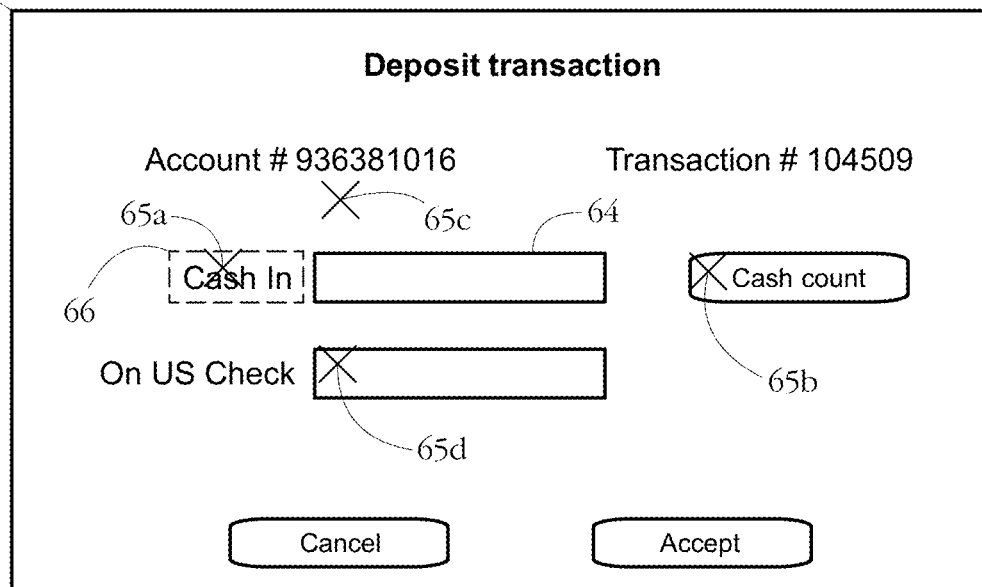
FIG. 7 shows an exemplary user interface, a target element, and a plurality of candidate anchor locations according to some embodiments of the present invention.
Figure 8:
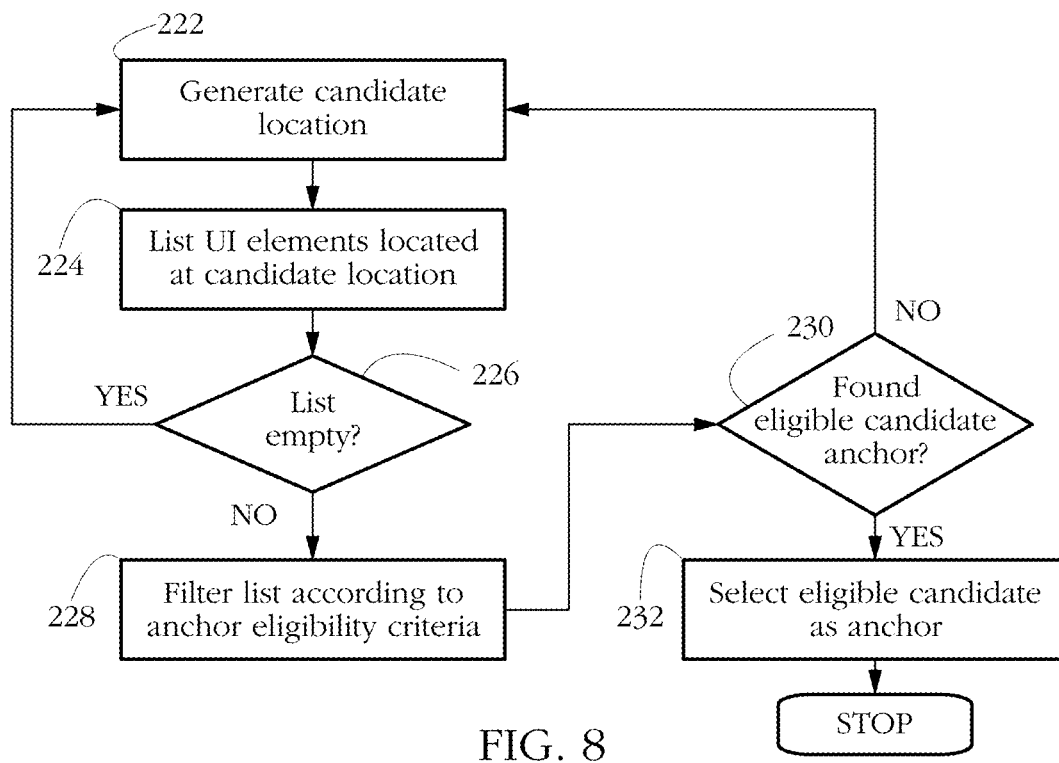
FIG. 8 shows an alternative sequence of steps carried out by a script authoring application to automatically identify an anchor element associated with a target element according to some embodiments of the present invention.

An alternative method of automatically selecting an anchor UI element is illustrated in FIGS. 7-8. In contrast to the previously described method wherein application 46 generates a set of candidate elements and then evaluates their fitness as anchors according to their position with respect to the target element, a step 222 may generate a candidate location within UI 58, for instance as a pair of screen coordinates {X,Y}. Such embodiments rely on the observation that reliable anchors such as text labels are usually found next to their associated target, for instance to their left, or directly above or below, depending on the default reading direction of the respective natural language of target UI 58. Therefore, some embodiments may explicitly look for potential anchor elements at such locations. FIG. 7 shows a plurality of candidate locations 65*a-d*. Such candidate locations may be determined according to a screen position of the target UI element (denoted as item 64 in FIG. 7), and/or according to a size of the target element. In some embodiments, the candidate location is generated randomly, for instance as a sum of a deterministic component and a random component.

Next, a step 224 may identify all UI elements located at approximately the candidate location. In some embodiments, an element is deemed to be located at a specific location when the respective location is within the screen bounds of the respective element. Another embodiment may consider an element to be located at specific location when a distance between a center/centroid of the respective element and the respective location is smaller than a pre-determined threshold. In the example of FIG. 7, UI element 66 may be considered to be located at candidate location 65*a*. In some embodiments, step 224 comprises issuing a call to a native function of OS 40, the respective function configured to return a list of UI elements that occupy a specific region of the screen. Other methods of determining which UI elements are located at the candidate location include parsing a source code (e.g., HTML script, style sheet) underlying the respective UI.

When no UI element is located at the respective candidate location, some embodiments return to step 222 to generate another candidate location. Otherwise, in a step 226, script authoring application 46 may filter the identified set of UI elements according to a set of anchor fitness criteria. Such criteria may include, among others, visibility (e.g., only visible UI elements may be selected as anchors) and element type (e.g., text elements may be preferred over other types of UI elements). Other fitness criteria may be similar to the ones described above in relation to FIGS. 5-6. For instance, application 46 may evaluate a positioning score according to whether the respective UI element is aligned with the target element, whether the respective UI element has a substantial overlap with the target element, etc.

When none of the UI elements located at the candidate location are deemed fit to be anchor (for instance when none has received a fitness score that exceeds a pre-determined threshold), some embodiments may return to step 222 to generate another candidate location. Otherwise, a step 232 may select an eligible UI element as anchor associated to the respective target element.

Figure 9:
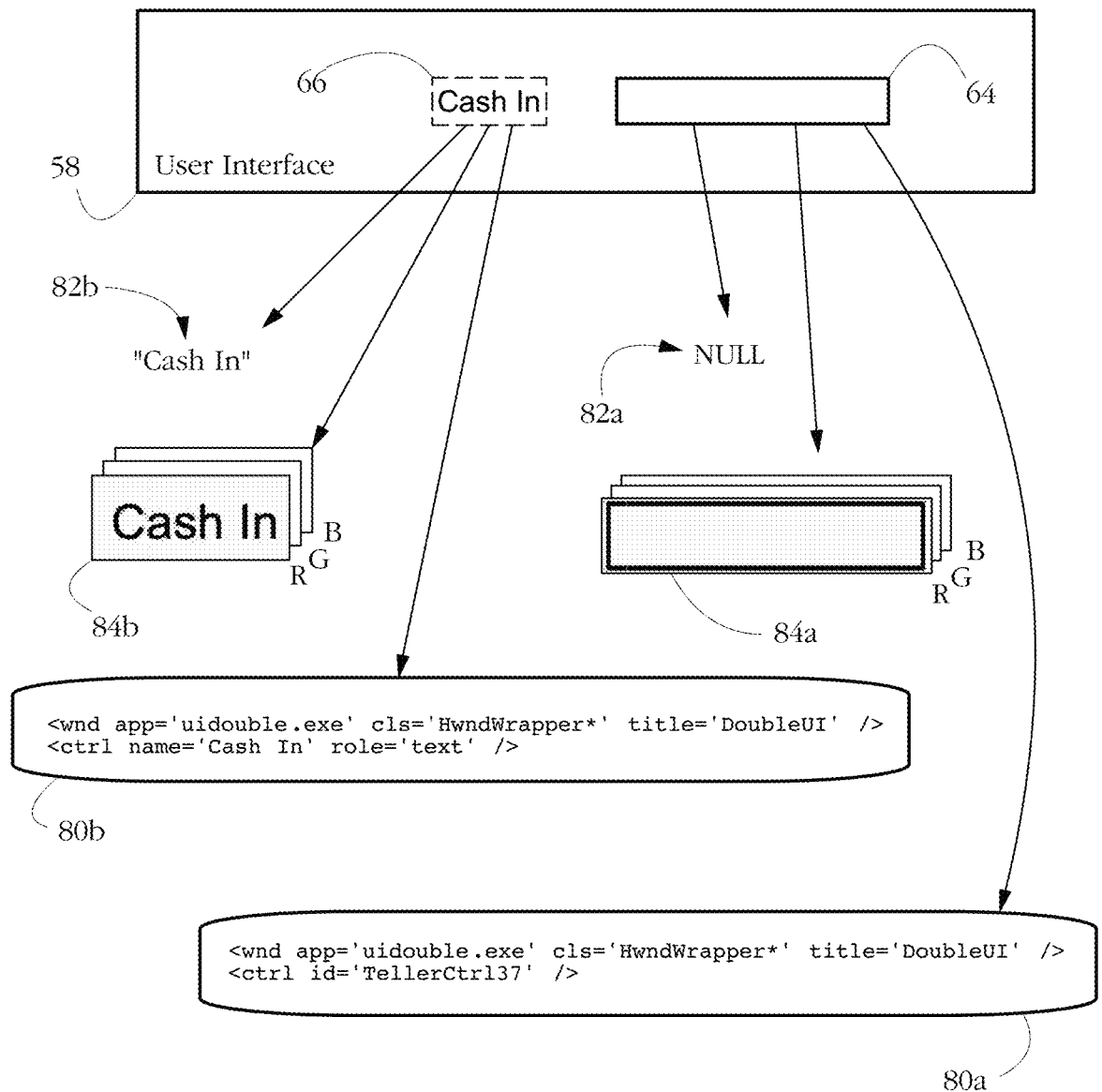
FIG. 9 shows an exemplary UI tree and an exemplary element ID characterizing a node of the UI tree according to some embodiments of the present invention.

In response to identifying the target and/or anchor UI elements, in a sequence of steps 112-114 (FIG. 4) script authoring application 46 may determine a set of element-characteristic features of the respective target and anchor elements. Such element-characteristic features according to some embodiments of the present invention are illustrated in FIG. 9, and include, among others, a set of element IDs 80*a-b*, a set of element texts 82*a-b*, and a set an element images 84*a-b* characterizing target element 64 and anchor element 66, respectively.

Element IDs 80*a-b* identify each UI element to the operating system and/or to the respective business application 42, for instance as a specific object within a hierarchy of objects that RPA client 10 uses to represent and/or render the respective user interface. In some embodiments, element IDs 80*a-b* are included in a source code of interface 58, for instance as a set of attribute-value pairs. The term source code of a user interface is herein understood to denote a programmatic representation of a content displayed by the respective user interface. Source code may encompass a program/script written in a programming language, as well as a data structure residing in a memory of RPA client 10. Exemplary source code comprises an HTML document which is rendered as a webpage by a web browser application.

Figure 10:
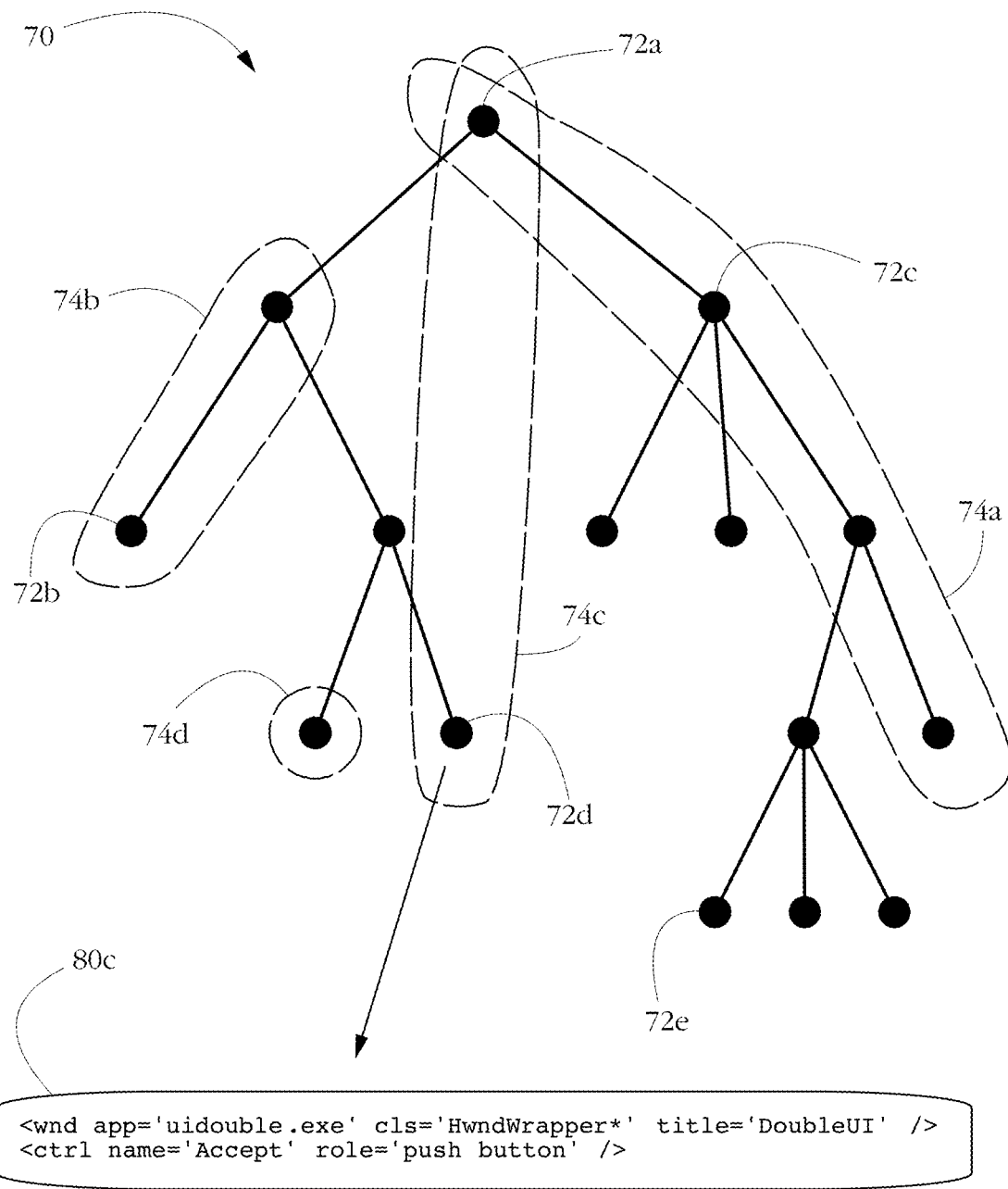
FIG. 10 illustrates various types of data characterizing a UI element according to some embodiments of the present invention.

In modern computing platforms, the operating system typically represents each user interface as a hierarchical data structure commonly known as a UI tree. An exemplary UI tree comprises a document object model (DOM) underlying a webpage rendered by a browser application. FIG. 10 shows an exemplary UI tree 70 having a plurality of nodes 72*a-e*. In some embodiments, each node 72*a-e* comprises an object representing a part of UI 58. In an exemplary UI such as the one illustrated in FIG. 5, a root node 72*a* may represent the entire UI window. Its children nodes may represent individual UI elements (e.g., text boxes, labels, form fields, buttons, etc.), groups of elements, distinct regions or blocks of the respective UI, etc. An intermediate node such as node 72*b* in FIG. 10 may represent a whole form, including all its input fields, labels and buttons. For instance, node 72*c* may represent the contents of a <form> or <fieldset> container of an HTML document. Another example of an intermediate node may represent a content of a <div> or <span> HTML container. Yet another example of intermediate node comprises contents of a header or footer of a document. End nodes such as 72*b*, 72*d*, and 72*e* (also known in the art as leaf nodes) are nodes that have no further children nodes, and may represent individual UI elements (e.g., a button, an individual label, an individual input field). In an example of a web browser UI, In some embodiments, each node 72*a-e* is specified using a set of attribute-value pairs, which may indicate, for instance, an identity of a parent node of the respective node, an identity of a child node of the respective node, a name, and a type of UI element represented by the respective node, among others.

In some embodiments, an element ID characterizing a UI element comprises a set of node identifiers that collectively indicate a location of a node within UI tree 70, the respective node representing the respective UI element. In one such example, an element ID 80*c* is indicative of a subset of nodes of UI tree 70, herein referred to as a subtree (see exemplary subtrees 74*a-d* in FIG. 10). As such, element ID 80*c* identifies a node/UI element as belonging to the respective subtree. For instance, node 72*d* belongs to subtree 74*c*. Exemplary element ID 80*c* includes a set of attribute-value pairs that identify the respective UI element as a 'push button' called 'Accept' visible within a window of an application called 'uidouble.exe'. The illustrated format of element ID 80*c* is provided only as an example; a skilled artisan will appreciate that there may be multiple other ways of representing a location of a specific node within a UI tree, beside a list of attribute-value pairs.

In some embodiments, determining element IDs 80*a-b* characterizing the target and anchor elements, respectively, comprises parsing a source code (e.g., a HTML document) of the target user interface 58 and extracting the respective element IDs, for instance as a set of attribute-value pairs associated with each UI element.

In some embodiments, each element text 82*a-b* (FIG. 9) comprise a computer encoding of a text (sequence of alphanumeric characters) displayed within the screen boundaries of the respective UI element. In the illustrated example, element text 82*a* has a value NULL, since target element 64 does not display any text. Meanwhile, element text 82*b* consists of the text 'Cash In'. The computer encoding of a text may include, for instance, a sequence of numeric character codes (e.g., Unicode), wherein each code corresponds to a distinct character of element texts 82*a-b*.

Embodiments of script authoring application 46 may determine element texts 82*a-b* using various methods. When application 46 has access to a source code of UI 58, application 46 may attempt to extract element texts 82*a-b* from the respective source code. For instance, the label displayed on a button of a web page can be found by parsing the HTML document associated with the respective web page. In the case of other business applications 42, script authoring application 46 may parse a data structure of OS 40 and/or business application 42 to determine whether element texts 82*a-b* are included in a source code of UI 58.

In an alternative embodiment, application 46 may employ image analysis tools such as an optical character recognition (OCR) computer program to determine element texts 82*a-b*. In one such example, an OCR tool may input an image of a screen region including the respective the target and/or anchor UI elements, and return a set of text tokens (e.g., words) and a bounding box determined for each text token. Exemplary bounding boxes include, among others, a polygon circumscribing the respective text token, and a convex hull of the respective token. A bounding box is illustrated by the dashed rectangle surrounding the text 'Cash In' in FIG.

9. In response to receiving text tokens and bounding boxes, application 46 may determine whether any bounding box substantially overlaps the respective UI elements, and when yes, select the text token located within the respective bounding box as text element 82 characterizing the respective target or anchor UI element. Substantial overlap may be established when a sufficient proportion (e.g., more than 50%, typically 80-100%) of the respective bounding box is located within the screen bounds of the respective UI element.

In some embodiments, each element image 84*a-b* (FIG. 9) characterizing a UI element comprises a computer encoding of an image displayed on screen within the boundaries of the respective UI element. The computer encoding of the image may include an array of pixel values corresponding to the respective screen region, possibly over multiple channels (e.g., RGB), and/or a set of values computed according to the respective array of pixel values (e.g., a JPEG or wavelet representation of the respective array of pixel values). Determining each element image 84*a-b* may comprise grabbing a content of a clipping of UI 58, i.e., of a limited region of UI 58 showing the respective UI element.

In a further step 116 (FIG. 4), script authoring application 46 may formulate the RPA script corresponding to the selected RPA activity. Stated otherwise, in step 116, application 46 outputs the robot's code to be used at runtime, for instance to a script file. RPA script 50 may be formulated in any computer-readable encoding known in the art, for instance in a version of XML or even compiled into a sequence of native processor instructions (e.g., machine code).

For each activity/automation step, authoring application 46 may output to RPA script 50 an indicator of the respective activity (e.g., click, type into, etc.), and may further output an encoding of element IDs 80*a-b*, element texts 82*a-b*, and element images 84*a-b* characterizing the target and anchor UI elements determined in steps 108-110. Encodings of characteristic features may include the characteristic data itself and/or other representations of such data, for instance an indicator of a network location (e.g., URL, network address) where element-characteristic data can be accessed remotely.

In some embodiments, application 46 may further output to RPA script 50 a set of parameter values for configuring the respective activity, for instance using a set of attribute-value pairs. One exemplary parameter is a matching accuracy indicating a threshold for comparing design-time element image 84 saved in RPA script 50 with a runtime image of a candidate UI element (see details below in relation to FIGS. 11-12). Another exemplary parameter is a timeout threshold indicating a maximum amount of time robot 44 may spend attempting to identify a runtime and/or target UI element.

Figure 11:
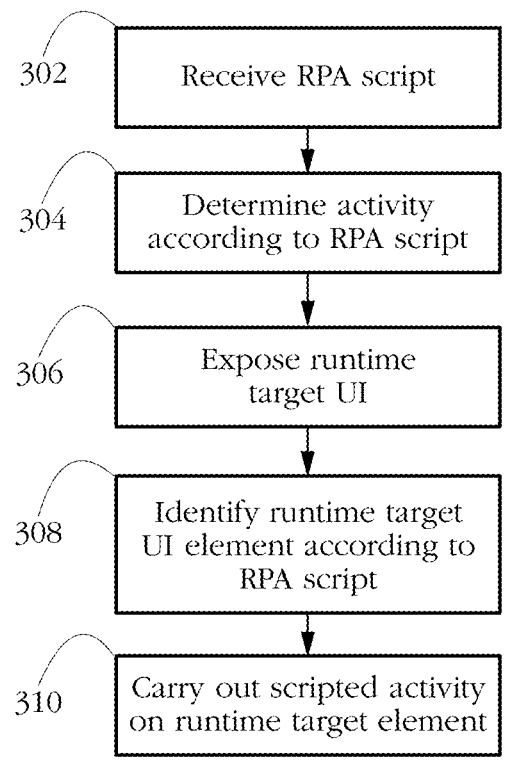
FIG. 11 shows an exemplary sequence of steps performed by an RPA robot according to some embodiments of the present invention.

Once the design phase of automation is complete, RPA script 50 may be transmitted to script repository 15 and/or distributed to other RPA clients for execution (see e.g., FIG. 1). FIG. 11 shows an exemplary sequence of steps carried out by RPA robot 44 at runtime. In response to receiving RPA script 50, a step 304 determines a type of activity to be performed according to a content of RPA script 50. Step 304 may further determine a target UI and/or a runtime business application (e.g., MS Excel®, Google Chrome®, etc.) that the respective robot is configured to interact with according to RPA script 50. In a step 306, RPA robot 44 may expose the respective target UI, for instance by invoking an instance of the respective business application on the local client machine. A further step 308 may automatically identify a runtime target UI element for the respective activity according to information stored in RPA script 50. The runtime target UI element comprises the operand of the respective activity, i.e., the UI element of the runtime target UI that robot 44 is configured to act upon (e.g. to click, to enter some text into, to grab the contents of, etc.). The execution of step 308 is described in detail below. In response to a successful identification of a runtime target UI element, a step 310 may automatically carry out the scripted activity, i.e., interact with the respective UI element as indicated in RPA script 50.

Figure 12:
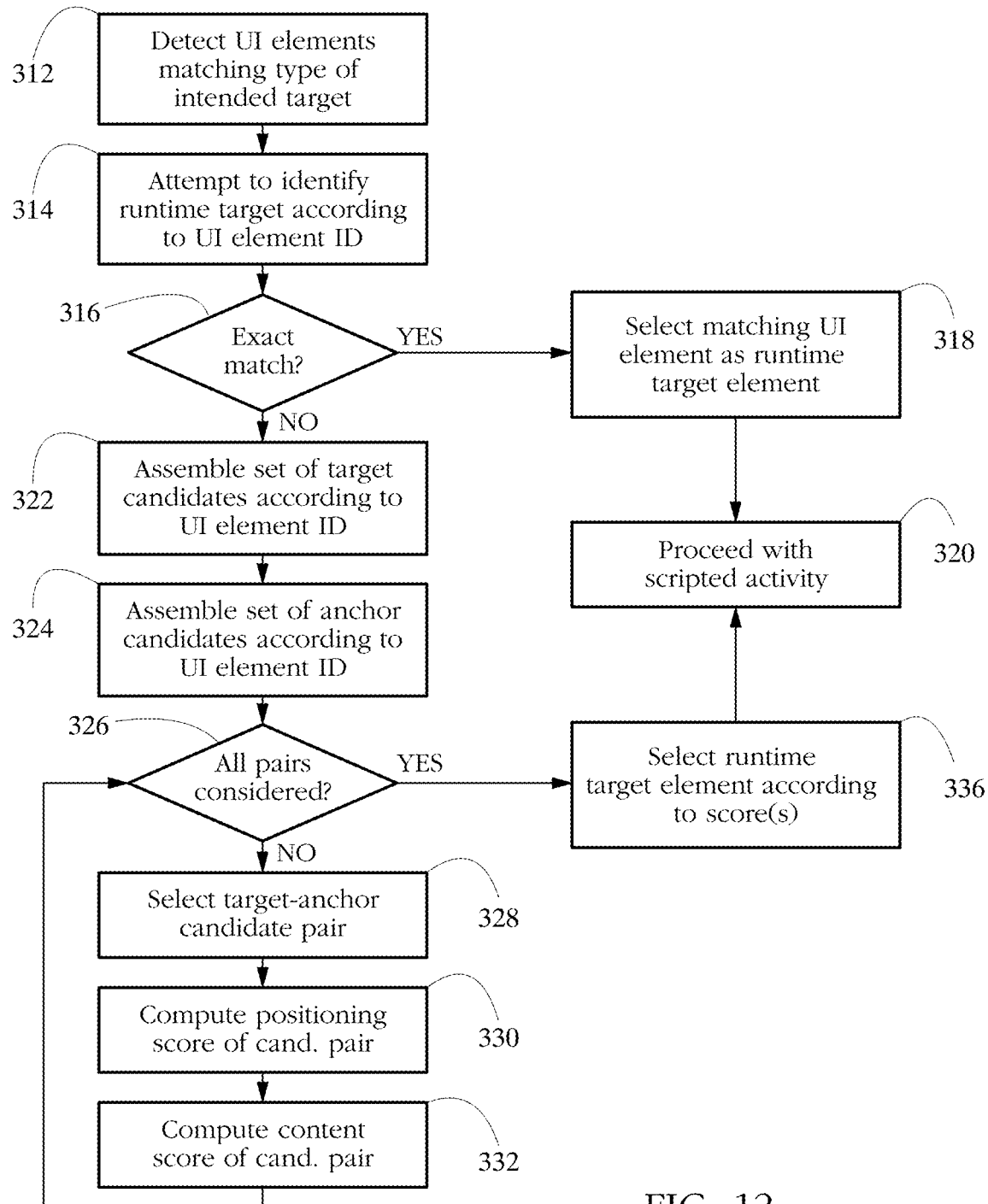
FIG. 12 shows an exemplary sequence of steps carried out by the RPA robot to identify a runtime target UI element according to some embodiments of the present invention.

FIG. 12 shows an exemplary sequence of steps performed by robot 44 to automatically identify a runtime target UI element according to some embodiments of the present invention. In a step 312, robot 44 may detect UI elements matching the type of target of the current activity. For instance, when the respective activity comprises typing into a form field, step 312 may comprise identifying a set of form fields within the runtime UI. Step 312 may comprise parsing a source code underlying the runtime target UI and/or identifying UI elements according to an on-screen image of the runtime UI, for instance using computer vision (e.g., a neural network trained to automatically recognize various UI elements such as buttons, text boxes, input fields, etc.). When the intended target and/or anchor elements comprise text, some embodiments may further employ OCR technology to automatically detect text elements and construct bounding boxes for the respective text elements.

Next, looking within the set of UI elements returned by step 312, a step 314 may attempt to identify the runtime target UI element according to the element ID (see description above in relation to FIGS. 9-10). In some embodiments, step 314 comprises determining an element ID of each UI element in the set returned by step 312 and comparing the respective element ID with element ID of the design-side target element (e.g., element ID 80*a* in FIG. 10), i.e., with the element ID specified by RPA script 50 as characterizing the target. A step 316 determines whether any element ID matches the element ID of the intended target of the current activity, and when yes, a step 318 may select the matching UI element as runtime target. In some embodiments, step 316 determines whether there is an exact match between the two element IDs. When element IDs are specified using a set of attribute-value pairs, a perfect match may occur when all values of corresponding attributes are identical.

However, due to occasional changes in the target user interface occurring between design time and runtime, it may happen that no UI element of the runtime target UI matches the design-time element ID of the intended target. For instance, it may happen that the name of a form field has changed. When no UI element matches the element ID indicated in RPA script 50, robot 44 may automatically infer a target/operand for the current activity from the available information. Some embodiments of the present invention use element text 82 and element image 84 as alternative, fallback data for identifying the runtime target when matching element IDs fails.

In one such example, a sequence of steps 322-324 may assemble a set of candidate runtime target elements and a set of candidate runtime anchor elements according to element IDs specified in RPA script 50 for the design-side target and anchor elements, respectively. The term 'candidate' is used herein to denote a UI element whose element ID is similar to that of the intended target or anchor element, respectively. Similarity may be determined in a variety of ways. In one exemplary embodiment, robot 44 may use a regular expression to determine whether two element IDs partially match. In an exemplary regular expression approach, two element ID are deemed similar when a specific subset of features are identical in both element IDs (for instance, when the element type is the same, but the element name differs). In an embodiment wherein an element ID is indicative of a position of the element in a UI tree, a partial matching strategy that uses regular expressions may allow robot 44 to search for candidates within a specific subtree, for instance only select candidates having the same root node specified in their element IDs (see e.g., description above in relation to FIG. 10). This situation may arise, for instance, if RPA client 10 has multiple instances of a business application running at the same time, and only one of them has the intended target element. Searching for candidate target elements with a fixed node may allow robot 44 to explore all the respective UI windows for candidates.

Another exemplary candidate selection strategy may determine whether two element IDs are similar according to a count of features that are different between the two element IDs. Such an approach may, for instance, determine a Levenshtein distance between the two element IDs, and compare the respective distance to a pre-determined threshold. Element IDs separated by a distance smaller than the threshold may be deemed similar. In some embodiments, the threshold value may be specified at design time and included in RPA script 50. In contrast to a partial matching method that used regular expressions, a method using a Levenshtein distance may be insensitive to which features are different between the two compared element IDs.

In response to selecting a set of candidate runtime targets and a set of candidate runtime anchor elements, some embodiments of robot 44 may evaluate the candidates in pairs (e.g., all combinations of a target candidate with an anchor candidate) to determine a most likely runtime target. In some embodiments, a sequence of steps 330-332 may evaluate each pair according to a relative screen position of the respective elements and according to a content (element text and/or element image) of each member of the respective pair.

For each pair of candidates, some embodiments may evaluate a positioning score of the respective target-anchor candidate pair (step 330) indicative of a likelihood that the candidate target is the intended runtime target element. Stated otherwise, in step 330, some embodiments determine a likelihood that the target candidate is the true, intended runtime target and that the anchor candidate is the anchor element specified in RPA script according to a relative position of the target and anchor candidate elements.

Figure 13:
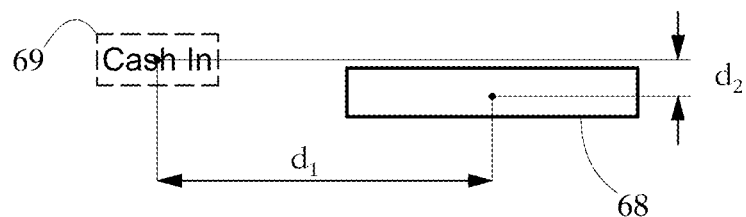
FIG. 13 shows a set of exemplary inter-element distances according to some embodiments of the present invention.

An exemplary positioning score may be determined according to various criteria, for instance according to a distance between the candidate anchor and the candidate target. FIG. 13 shows a set of exemplary distances separating a candidate target element 68 (in this example, an input field) from a candidate anchor element 69 (a label) according to some embodiments of the present invention. Distances $d_1$ and $d_2$ may be measured between the centers/centroids of the respective elements, along the principal coordinates of the screen (e.g., horizontal and vertical). For text elements detected using OCR, the distance may be measured to the center or centroid of a bounding box circumscribing the respective text element. Other exemplary inter-element distances, such as a Manhattan distance, Euclidean distance, etc., may be evaluated according to $d_1$ and $d_2$. Some embodiment rely on the observation that an anchor element is typically located in the vicinity of its target element, so the larger the distance between a candidate anchor and a candidate target, the less likely it is that the respective pair represents the design-time target and anchor elements. In such embodiments, an exemplary positioning score may be determined according to 1/D or $(1-D/D_{max})$, wherein D denotes an inter-element distance determined according to $d_1$ and/or $d_2$, and $D_{max}$ denotes a pre-determined threshold beyond which two UI elements are considered unlikely to be a target-anchor pair.

Figure 14:
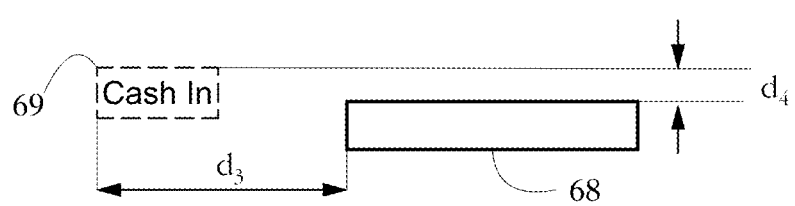
FIG. 14 shows another set of exemplary inter-element distances according to some embodiments of the present invention.

Another exemplary positioning score may be determined according to a degree of alignment between the candidate anchor and candidate target elements. Alignment may be determined according to another set of distances as illustrated for instance in FIG. 14. An exemplary distance $d_3$ separates a left edge of anchor candidate 69 from the left edge of target candidate 68. Meanwhile, a distance $d_4$ separates a top edge of anchor candidate 69 from a top edge of target candidate 68. Some embodiments rely on the observation that anchors are typically aligned with their target elements, so relatively small $d_3$ or $d_4$ distances may be associated with a relatively high likelihood that the respective anchor and target candidate elements are indeed a target-anchor pair. FIG. 14 only shows distances that may be used to test left and/or top alignment; an artisan will understand that the illustrated distance measurements may be modified to test right and/or bottom alignment. An exemplary fitness score may be calculated as:

$$P(\delta) = \begin{cases} 1, & \text{when } \delta < \delta_{max} \\ 0, & \text{otherwise} \end{cases},$$

wherein $\delta$ is an alignment distance determined according to $d_3$ and/or $d_4$ and $\delta_{max}$ is a predetermined threshold beyond which two UI elements are considered not to be aligned.

Figure 15:
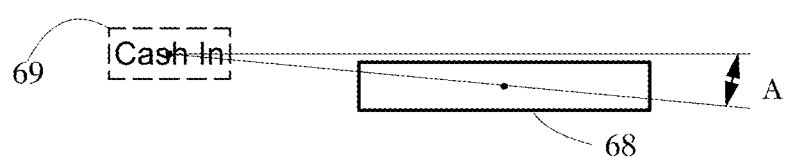
FIG. 15 shows an exemplary inter-element angle according to some embodiments of the present invention.

Another exemplary positioning score may be determined according to an angle between the candidate anchor and candidate target. FIG. 15 shows an exemplary angle A between anchor candidate 69 and target candidate 68, determined as the angle of a straight line connecting the centers/centroids of the two respective elements. In some embodiments, angle A is determined according to distance measurements, for instance $A=d_2/d_1$, using the notation in FIG. 13. In some embodiments, the angle serves as a vehicle for determining a degree of alignment of the target and anchor candidates. Some embodiments may further calculate a positioning score by comparing an angle calculated at runtime between a target and anchor candidates to an angle determined at design time between the actual anchor and target elements. The design-time angle may be included in RPA script 50. A relatively small difference between the design-time and runtime angles may indicate that the current target-anchor candidate pair sits in approximately the same relative position as the design time target and anchor elements, and therefore may indicate a relatively high likelihood that the candidates are the true, sought-after runtime target and anchor elements. An exemplary positioning score determined according to the angle may be determined according to $1/|A_d - A_r|$, wherein $A_d$ denotes the angle determined at design time between the true anchor and target elements (e.g., specified in RPA script 50), and wherein $A_r$ denotes the angle determined at runtime between the candidate target and the candidate anchor.

Figure 16:
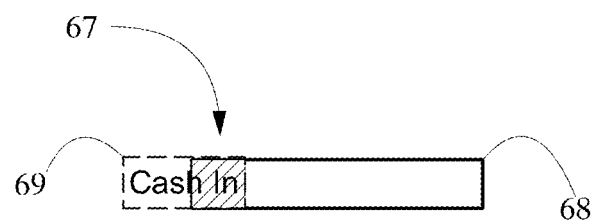
FIG. 16 illustrates an exemplary degree of overlap between two UI elements according to some embodiments of the present invention.

Yet another exemplary positioning score may be determined according to a degree of overlap between the anchor candidate and target candidate elements. FIG. 16 shows an exemplary degree of overlap 67 according to some embodiments of the present invention, degree of overlap 67 determined as a proportion of one element intersecting the other element, or stated otherwise, how much of one element overlaps with the other. In such embodiments, two elements that do not intersect have zero overlap, whereas two elements wherein one element completely contains the other have 100% overlap. Some embodiments use a positioning score determined according to a degree of overlap to identify specific anchors, such as button labels. In one such example wherein robot 44 is looking for a target element of the button type, it can eliminate all target-anchor candidate pairs that do not have a substantial degree of overlap (e.g., more than 90%).

In a further step 332 (FIG. 12), some embodiments of robot 44 determine a content score of a target-anchor candidate pair. Content scores may be determined according to a result of comparing an on-screen content (image and/or text) of the target and anchor candidates with the respective content of the design-side target and anchor. In some embodiments, comparing on-screen content comprises evaluating a numerical measure of similarity between the text displayed by the target candidate with the text displayed by the design-side target element, and another measure of similarity between the text displayed by the anchor candidate and the text displayed by the design-side anchor element. The element text of the design-side target and anchor elements are specified in RPA 50 (see e.g., items 82a-b in FIG. 9 and associated description). Similarity between two text fragments may be evaluated, for instance, using a Levenshtein distance, wherein a relatively small distance may indicate a relatively high similarity between the compared fragments.

Step 332 may further comprise determining a numerical measure of similarity between an image of the target candidate and the image of the design-side target element, and another measure of similarity between an image of the anchor candidate and the image of the design-side anchor element. The element image of the design-side target and anchor elements are specified in RPA script 50 (see e.g., items 84a-b in FIG. 9 and associated description). Several measures of similarity between two images are known in the art.

Text similarity may be used independently of image similarity, or the two may be combined in an aggregate content score. Aggregating the image and text aspects may provide a more robust method of identifying the runtime target element in situations where either the text or the image of the target or anchor elements has changed between design and runtime. In such situations, robot 44 may determine that two UI elements are similar according to the text content, even if the image content does not match, or vice-versa. Also, combining a content score determined for the anchor with a content score determined for the target may result in a more robust method in situations wherein only the target element has changed between design time and runtime, while the anchor has remained approximately identical. In such situations, robot 44 may be able to identify the runtime target according to a content of the candidate anchor.

In an alternative embodiment, robot 44 uses step 330 as a filter for target-anchor candidate pairs. In one such example, for each candidate pair, robot 44 may evaluate a set of indicators of a relative position of the target candidate with respect to the anchor candidate, for instance a set of distances as described above in relation to FIGS. 13-14. When the evaluated distance(s) indicate that the target and anchor candidates are unlikely to be the true sought-after runtime target-anchor pair, for instance because they are too far apart and/or are not aligned, the respective target-anchor candidate pair is no longer considered for content score evaluation (step 332). Such optimizations may substantially lower the computational cost of identifying the runtime target, since image analysis is typically resource-intensive.

In a step 336, robot 44 may select a runtime target from the set of target candidates identified in step 322 according to positioning and/or content scores determined for each of the set of target-anchor candidate pairs. In some embodiments, step 336 may compute an aggregate score for each pair, the aggregate score combining positioning and content scores determined for the respective pair. Scores may be combined using various methods known in the art, for instance as a weighted average wherein each score is multiplied by a pre-determined numerical weight. The value of the weight may indicate a degree of reliability associated with the respective score (e.g., scores which are more likely to correctly identify the runtime target may be given relatively higher weight).

In some embodiments, the target candidate element of the pair whose aggregate score indicates the highest similarity to the design-side target-anchor pair specified in RPA 50 is chosen as runtime target element. Robot 44 may then proceed with the scripted activity (step 320), i.e., apply the current activity to the selected runtime target.

Figure 17:
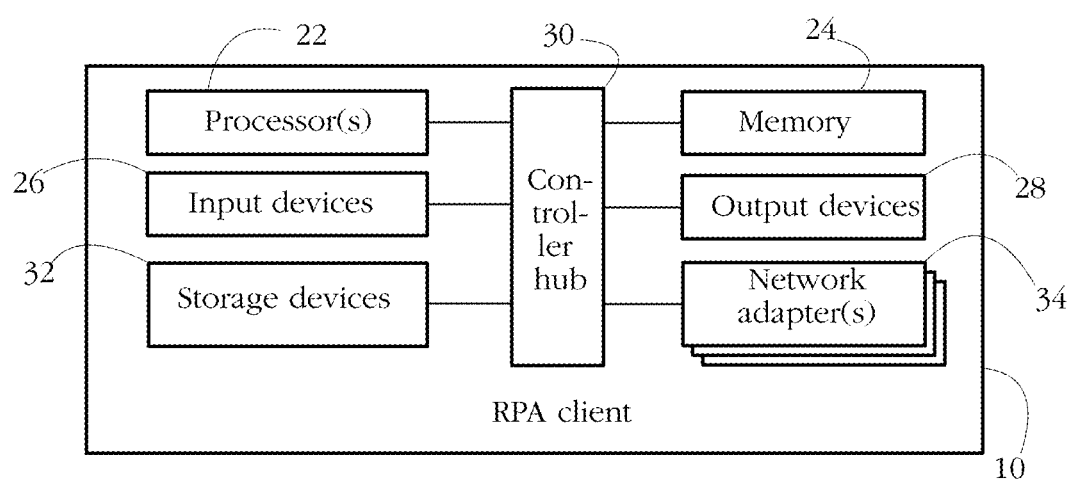
FIG. 17 illustrates an exemplary embodiment of a computing device configured to carry out methods described herein.

FIG. 17 shows an exemplary hardware configuration of a computing device programmed to execute some of the methods described herein. The respective computing device may represent any of RPA clients 10a-e in FIG. 1, for instance a personal computer as illustrated in FIG. 18. Other computing devices such as mobile telephones, tablet computers, and wearables may have slightly different configurations. Processor(s) 22 comprise a physical device (e.g. microprocessor, multi-core integrated circuit formed on a semiconductor substrate) configured to execute computational and/or logical operations with a set of signals and/or data. Such signals or data may be encoded and delivered to processor(s) 22 in the form of processor instructions, e.g., machine code. Processor(s) 22 may include a central processing unit (CPU) and/or an array of graphics processing units (GPU).

Memory unit 24 may comprise volatile computer-readable media (e.g. dynamic random-access memory—DRAM) storing data/signals/instruction encodings accessed or generated by processor(s) 22 in the course of carrying out operations. Input devices 26 may include computer keyboards, mice, and microphones, among others, including the respective hardware interfaces and/or adapters allowing a user to introduce data and/or instructions into RPA client 10. Output devices 28 may include display devices such as monitors and speakers among others, as well as hardware interfaces/adapters such as graphic cards, enabling the respective computing device to communicate data to a user. In some embodiments, input and output devices 26-28 share a common piece of hardware (e.g., a touch screen). Storage devices 32 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 34 enable the respective computing device to connect to an electronic communication network (e.g., networks 12 and 14 in FIG. 1) and/or to other devices/computer systems.

Controller hub 30 generically represents the plurality of system, peripheral, and/or chipset buses, and/or all other circuitry enabling the communication between processor(s) 22 and the rest of the hardware components of RPA client 10. For instance, controller hub 30 may comprise a memory controller, an input/output (I/O) controller, and an interrupt controller. Depending on hardware manufacturer, some such controllers may be incorporated into a single integrated circuit, and/or may be integrated with processor(s) 22. In another example, controller hub 30 may comprise a northbridge connecting processor 22 to memory 24, and/or a southbridge connecting processor 22 to devices 26, 28, 32, and 34.

The exemplary systems and methods described above facilitate RPA operations by improving the automatic identification of activity targets, i.e., user interface elements acted upon by robotic software. Target identification poses a substantial technical problem, because in typical RPA applications, the target user interface (e.g., an e-commerce webpage, an accounting interface, etc.) is developed and maintained independently of the robot design to interact with the respective interface. Therefore, the functionality and/or appearance of the target UI may change without the knowledge of RPA developers. Successful RPA may therefore depend upon a robust method of identifying an activity target, method which is relatively insensitive to variations in the design of the target user interface.

When designing robotic software (a stage of automation commonly known as design-time), the RPA developer invokes an instance of the target UI and indicates a target element and an activity to be performed on the respective target element. For instance, the developer may indicate a button of the target UI and configure the robot to click on the respective button. In another example, the developer may indicate an input field and configure the robot to type some text into the respective input field. In yet another example, the developer may indicate a text box of the user interface and configured the robot to grab the content of the respective text box. The resulting robot code may include an indicator of the target element and an indicator of the respective activity. The robot code may then be distributed to RPA clients.

In another stage of automation commonly known as runtime, a client machine may execute the respective robot, which may attempt to interact with another, client-side instance of the target UI. However, the client-side UI may not be identical to the design-side UI. When the target UI comprises a web interface, and especially when the respective robot is designed to interact with a complex web site, the respective user interface may change, even multiple times in the course of a day. Web developers of the respective web site may tweak the appearance, for instance changing a position of a button, changing the composition of a menu, and/or changing the color scheme, fonts, and size of various elements. Robotic software may therefore have to successfully identify a target element, even when the appearance of the interface has changed.

Some conventional RPA systems identify a target element according to its name or ID that is specified in the source code or data structure underlying the respective user interface (for instance, the HTML code that specifies the appearance and content of a webpage. However, such systems and methods may fail when the name of the respective element unexpectedly changes. Such changes may occur quite frequently, especially since a substantial proportion of web documents are currently being generated dynamically, and various aspects of a web document are controlled algorithmically.

In contrast to such conventional approaches, some embodiments of the present invention additionally identify the target element according to its image and text displayed at design time. The design-time image and text are saved in the robot's code and transmitted to RPA clients. At runtime, the robot may identify a plurality of candidate target elements and evaluate each one according to an element ID, and further according to an image and text displayed by the respective candidate element. The candidate which at least partially matches the ID, image, and text of the design-time target element may be selected as the runtime target. The robot may then apply the scripted activity to the selected runtime target element.

Some embodiments may use an optimization strategy to save computational resources and therefore improve RPA efficiency and user experience at runtime. In a first phase, the robot may attempt to identify the runtime target according to the element ID, and when such identification fails (for instance because the element's name has changed in the source code of the UI), may use text matching and/or image matching as a fallback position. The candidate UI elements may be chosen so that they partially match the element ID of the design-time target element. Partially matching the element ID may enable the robot to search for the target element within a relevant sub-group of candidates (for instance candidates belonging to the same region of the UI as the design-side target element).

To further improve the robustness of the method, some embodiments employ characteristic data (e.g., element ID, image and text data) of another UI element of the target interface, the other element co-displayed with, and deemed an anchor for, the target element. At runtime, some embodiments may identify a plurality of candidate anchor elements and try to match each candidate to the design-time anchor according to the element ID, image, and/or data. Using anchor element data in conjunction with target element data relies on the assumption that it is less likely that both the target and anchor have changed between design time and runtime, so that the target may be successfully identified based on data characterizing its anchor.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:
   in response to receiving a robotic process automation (RPA) script comprising a set of target features and a set of anchor features, the target features characteristic of a target element of a target user interface (UI), the anchor features characteristic of an anchor element of the target UI, automatically identify a runtime instance of the target element within a runtime UI exposed by the computer system; and
   automatically carry out an operation that reproduces a result of an interaction of a human operator with the runtime instance of the target element, the operation determined according to the RPA script;
   wherein the set of target features comprises:
      a target ID indicative of a position of the target element within a tree representation of the target UI,
      a target image comprising an image of the target element within the target UI, and
      a target text comprising a sequence of characters displayed by the target element within the target UI;
   wherein the set of anchor features comprises:
      an anchor ID indicative of a position of the anchor element within the tree representation of the target UI,
      an anchor image comprising an image of the anchor element within the target UI, and
      an anchor text comprising a sequence of characters displayed by the anchor element within the target UI;
   the method comprising identifying the runtime instance of the target element according to the target ID, target image, target text, anchor ID, anchor image, and anchor text.

2. The method of claim 1, wherein automatically identifying the runtime instance of the target element comprises:
   for each candidate of a plurality of candidate UI elements of the runtime UI, determining whether an element ID of the each candidate exactly matches the target ID, the element ID of the each candidate indicative of a position of the each candidate within a tree representation of the runtime UI;
   in response, when the element ID of the each candidate exactly matches the target ID, designating the each candidate as the runtime instance of the target element; and
   when no candidate of the plurality of candidate UI elements has an element ID exactly matching the target ID, identifying the runtime instance of the target element further according to the target image and target text.

3. The method of claim 2, further comprising:
   selecting a candidate target from the plurality of candidate UI elements according to whether an element ID of the candidate target partially matches the target ID;
   selecting a candidate anchor from the plurality of candidate UI elements according to whether an element ID of the candidate anchor partially matches the anchor ID;
   in response to selecting the candidate target and candidate anchor, determining whether to designate the candidate target as the runtime instance of the target element according to a result of comparing the target text with a text displayed by the candidate target, and further according to a result of comparing the anchor text with a text displayed by the candidate anchor.

4. The method of claim 3, further comprising, in response to selecting the candidate target and candidate anchor, determining whether to designate the candidate target as the runtime instance of the target element further according to a result of comparing the target image with an on-screen image of the candidate target, and further according to a result of comparing the anchor image with an on-screen image of the candidate anchor.

5. The method of claim 3, further comprising, in response to selecting the candidate target and candidate anchor, determining whether to designate the candidate target as the runtime instance of the target element further according to a relative on-screen position of the candidate target with respect to the candidate anchor.

6. The method of claim 5, wherein determining the relative on-screen position comprises determining an angle of a line connecting a center of the candidate target to a center of the candidate anchor.

7. The method of claim 5, wherein determining the relative on-screen position comprises determining a degree of overlap between the candidate target and the candidate anchor.

8. The method of claim 1, wherein the interaction comprises an item selected from a group consisting of performing a mouse click on the runtime instance of the target element, pressing a specific combination of keyboard keys, writing a sequence of characters into the runtime instance of the target element, grabbing an on-screen image of the runtime instance of the target element, and grabbing a text displayed by the runtime instance of the target element.

9. The method of claim 1, wherein the target element comprises an item selected from a group consisting of a UI window, a menu, a button, a text area, and a form field.

10. A computer system comprising at least one hardware processor configured to execute an automation target application and a robotic process automation (RPA) robot, wherein:
the automation target application is configured to expose a runtime user interface (UI); and
the RPA robot is configured to:
in response to receiving an RPA script comprising a set of target features and a set of anchor features, the target features characteristic of a target element of a target UI, the anchor features characteristic of an anchor element of the target UI, automatically identify a runtime instance of the target element within the runtime UI; and
automatically carry out an operation that reproduces a result of an interaction of a human operator with the runtime instance of the target element, the operation determined according to the RPA script;
wherein the set of target features comprises:
a target ID indicative of a position of the target element within a tree representation of the target UI,
a target image comprising an image of the target element within the target UI, and
a target text comprising a sequence of characters displayed by the target element within the target UI;
wherein the set of anchor features comprises:
an anchor ID indicative of a position of the anchor element within the tree representation of the target UI,
an anchor image comprising an image of the anchor element within the target UI, and
an anchor text comprising a sequence of characters displayed by the anchor element within the target UI;
and wherein automatically identifying the runtime instance of the target element comprises identifying the runtime instance of the target element according to the target ID, target image, target text, anchor ID, anchor image, and anchor text.

11. The computer system of claim 10, wherein automatically identifying the runtime instance of the target element comprises:
for each candidate of a plurality of candidate UI elements of the runtime UI, determining whether an element ID of the each candidate exactly matches the target ID, the element ID of the each candidate indicative of a position of the each candidate within a tree representation of the runtime UI;
in response, when the element ID of the each candidate exactly matches the target ID, designating the each candidate as the runtime instance of the target element; and
when no candidate of the plurality of candidate UI elements has an element ID exactly matching the target ID, identifying the runtime instance of the target element further according to the target image and target text.

12. The computer system of claim 11, wherein the RPA robot is further configured to:
select a candidate target from the plurality of candidate UI elements according to whether an element ID of the candidate target partially matches the target ID;
select a candidate anchor from the plurality of candidate UI elements according to whether an element ID of the candidate anchor partially matches the anchor ID;
in response to selecting the candidate target and candidate anchor, determine whether to designate the candidate target as the runtime instance of the target element according to a result of comparing the target text with a text displayed by the candidate target, and further according to a result of comparing the anchor text with a text displayed by the candidate anchor.

13. The computer system of claim 12, wherein the RPA robot is further configured, in response to selecting the candidate target and candidate anchor, to determine whether to designate the candidate target as the runtime instance of the target element further according to a result of comparing the target image with an on-screen image of the candidate target, and further according to a result of comparing the anchor image with an on-screen image of the candidate anchor.

14. The computer system of claim 12, wherein the RPA robot is further configured, in response to selecting the candidate target and candidate anchor, to determine whether to designate the candidate target as the runtime instance of the target element further according to a relative on-screen position of the candidate target with respect to the candidate anchor.

15. The computer system of claim 14, wherein determining the relative on-screen position comprises determining an angle of a line connecting a center of the candidate target to a center of the candidate anchor.

16. The computer system of claim 14, wherein determining the relative on-screen position comprises determining a degree of overlap between the candidate target and the candidate anchor.

17. The computer system of claim 10, wherein the interaction comprises an item selected from a group consisting of performing a mouse click on the runtime instance of the target element, pressing a specific combination of keyboard keys, writing a sequence of characters into the runtime instance of the target element, grabbing an on-screen image of the runtime instance of the target element, and grabbing a text displayed by the runtime instance of the target element.

18. The computer system of claim 10, wherein the target element comprises an item selected from a group consisting of a UI window, a menu, a button, a text area, and a form field.

19. A non-transitory computer-readable medium storing instructions which, when executed by at least one hardware processor of a computer system configured to expose a runtime user interface (UI), cause the computer system to:
in response to receiving a robotic process automation (RPA) script comprising a set of target features and a set of anchor features, the target features characteristic of a target element of a target UI, the anchor features characteristic of an anchor element of the target UI, automatically identify a runtime instance of the target element within the runtime UI; and
automatically carry out an operation that reproduces a result of an interaction of a human operator with the runtime instance of the target element, the operation determined according to the RPA script;

wherein the set of target features comprises:
- a target ID indicative of a position of the target element within a tree representation of the target UI,
- a target image comprising an image of the target element within the target UI, and
- a target text comprising a sequence of characters displayed by the target element within the target UI;

wherein the set of anchor features comprises:
- an anchor ID indicative of a position of the anchor element within the tree representation of the target UI,
- an anchor image comprising an image of the anchor element within the target UI, and
- an anchor text comprising a sequence of characters displayed by the anchor element within the target UI;

and wherein automatically identifying the runtime instance of the target element comprises identifying the runtime instance of the target element according to the target ID, target image, target text, anchor ID, anchor image, and anchor text.

* * * * *